United States Patent
Dobbs et al.

(10) Patent No.: US 6,697,155 B2
(45) Date of Patent: Feb. 24, 2004

(54) MULTISPECTRAL ACTIVE REMOTE SENSING WITHOUT NARROWBAND OPTICAL FILTERS

(75) Inventors: Michael E. Dobbs, Fort Wayne, IN (US); D. Allan Roberts, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 114 days.

(21) Appl. No.: 10/118,434

(22) Filed: Apr. 9, 2002

(65) Prior Publication Data

US 2003/0227626 A1 Dec. 11, 2003

(51) Int. Cl.$^7$ .............................. G01J 3/28; G01N 21/17
(52) U.S. Cl. ..................... 356/300; 356/51; 250/339.05; 250/339.11; 250/341.8
(58) Field of Search ................................. 356/300, 420, 356/51; 250/339.05, 339.06, 339.11, 341.8

(56) References Cited

U.S. PATENT DOCUMENTS

| | | | |
|---|---|---|---|
| 5,149,959 A | 9/1992 | Collins et al. | 250/226 |
| 5,394,237 A | 2/1995 | Chang et al. | 356/328 |
| 5,410,154 A | * 4/1995 | Broicher et al. | 250/339.05 |
| 5,606,413 A | 2/1997 | Bellus et al. | 356/326 |
| 6,323,941 B1 | 11/2001 | Evans et al. | 356/4.01 |

* cited by examiner

*Primary Examiner*—F. L. Evans
(74) *Attorney, Agent, or Firm*—Harrity & Snyder LLP

(57) ABSTRACT

A remote platform obtaining a spectrum of one or more locations by moving the platform to sequentially illuminating the locations with different wavelengths of radiation. The different wavelengths of radiation reflected from the locations may be sequentially detected and converted into data. Spectra of the locations may be assembled from the data that was sequentially collected as the platform moved.

27 Claims, 5 Drawing Sheets

MULTISPECTRAL ACTIVE REMOTE SENSING WITHOUT NARROWBAND OPTICAL FILTERS

BACKGROUND OF THE INVENTION

1. Field of the Invention

This invention relates to remote sensing and, more particularly, to active multispectral remote sensing.

2. Description of Related Art

Multispectral remote sensing may be conceptualized as viewing radiation reflected and/or emitted from a certain location in two or more wavelength regions. In other words, multispectral sensing measures the intensity of radiation for the location at two or more different wavelengths. Active multispectral remote sensing utilizes a source of radiation (e.g., infrared, visible, or ultraviolet light) to illuminate a target while measuring the reflected and/or emitted radiation.

One scheme for performing active multispectral remote sensing is to stare at the location with a single detector, while sequentially illuminating the location with two or more different wavelengths. Such a scheme may be unsuitable, however, for sensing from a remote platform that is moving relative to the location under measurement. To stare at the location for a long enough time may entail, for example, the use of a scanning/tracking mirror on the moving platform, which may introduce undesired errors or complexity.

Another scheme for performing active multispectral remote sensing is to stare at the location with multiple detectors, while simultaneously illuminating the location with two or more different wavelengths. Each detector is typically coupled to an optical filter, so that each of the detectors only detects one of the different wavelengths. Spectral features of interest, however, may necessitate narrowband optical filters whose passbands are closely spaced in wavelength. Such narrowband optical filters, however, may be expensive to implement, and may also cause undesired crosstalk between detectors.

Thus, there is a need in the art to perform active multispectral remote sensing from a moving platform in an inexpensive and precise manner.

SUMMARY OF THE INVENTION

Systems and processes consistent with the principles of the invention may include, among other things, a moving or stationary remote platform that may emit and detect different wavelengths of radiation toward a location at different times. A spectrum of that location may be assembled from data collected at the different times.

In accordance with one purpose of the invention as embodied and broadly described herein, an active system for obtaining a multispectral image of a target may include a number of sources configured to emit radiation toward different locations on the target. At least two of the number of sources may emit radiation of different wavelengths. A number of detectors may correspond to the number of sources and may be oriented toward the different locations on the target. At least two of the number of detectors may be configured to detect the radiation of different wavelengths. A processor may be configured to construct spectra of the different locations on the target from data obtained by the number of detectors as the system moves relative to the target.

In another implementation consistent with principles of the invention, a mobile remote sensing platform may include a first source having a first field of view and being configured to emit radiation of a first wavelength. A first detector may have a field of view that overlaps the first field of view and may be configured to detect the radiation of the first wavelength. A second source may have a second field of view that is separate from the first field of view and may be configured to emit radiation of a second wavelength. A second detector may have a field of view that overlaps the second field of view and may be configured to detect the radiation of the second wavelength.

In a further implementation consistent with principles of the invention, a method for constructing a spectrum may include emitting first and second wavelengths of radiation toward first and second locations, respectively. The first and second wavelengths of radiation respectively reflected from the first and second locations may be detected at a first time. The first and second wavelengths of radiation may be emitted toward the second location and a third location, respectively. The first and second wavelengths respectively reflected from the second and third locations may be detected at a second time. A spectrum for the second location may be constructed using the wavelengths of radiation detected at the first and second times.

In a yet another implementation consistent with principles of the invention, a method for obtaining a spectrum of a location by a moving platform may include emitting radiation of a first wavelength toward the location and detecting radiation of the first wavelength reflected from the location. The method may include moving the platform relative to the location. The method may also include emitting radiation of a second wavelength toward the location and detecting radiation of the second wavelength reflected from the location. The method may further include assembling a spectrum of the location using the detected radiation of the first and second wavelengths.

In a further implementation consistent with principles of the invention, a method for obtaining a spectrum of a location by a remote platform may include sequentially illuminating the location with different wavelengths of radiation by moving the platform. The different wavelengths of radiation reflected from the location may be sequentially detected and converted into data. A spectrum of the location may be assembled from the data that was sequentially collected.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

As described herein, in one implementation consistent with the principles of the invention, a moving remote platform may emit and detect different wavelengths of radiation toward a location as it moves relative to that location. A spectrum of that location may be assembled from data collected at different times during the platform's movement.

Exemplary Systems

Figure 1:
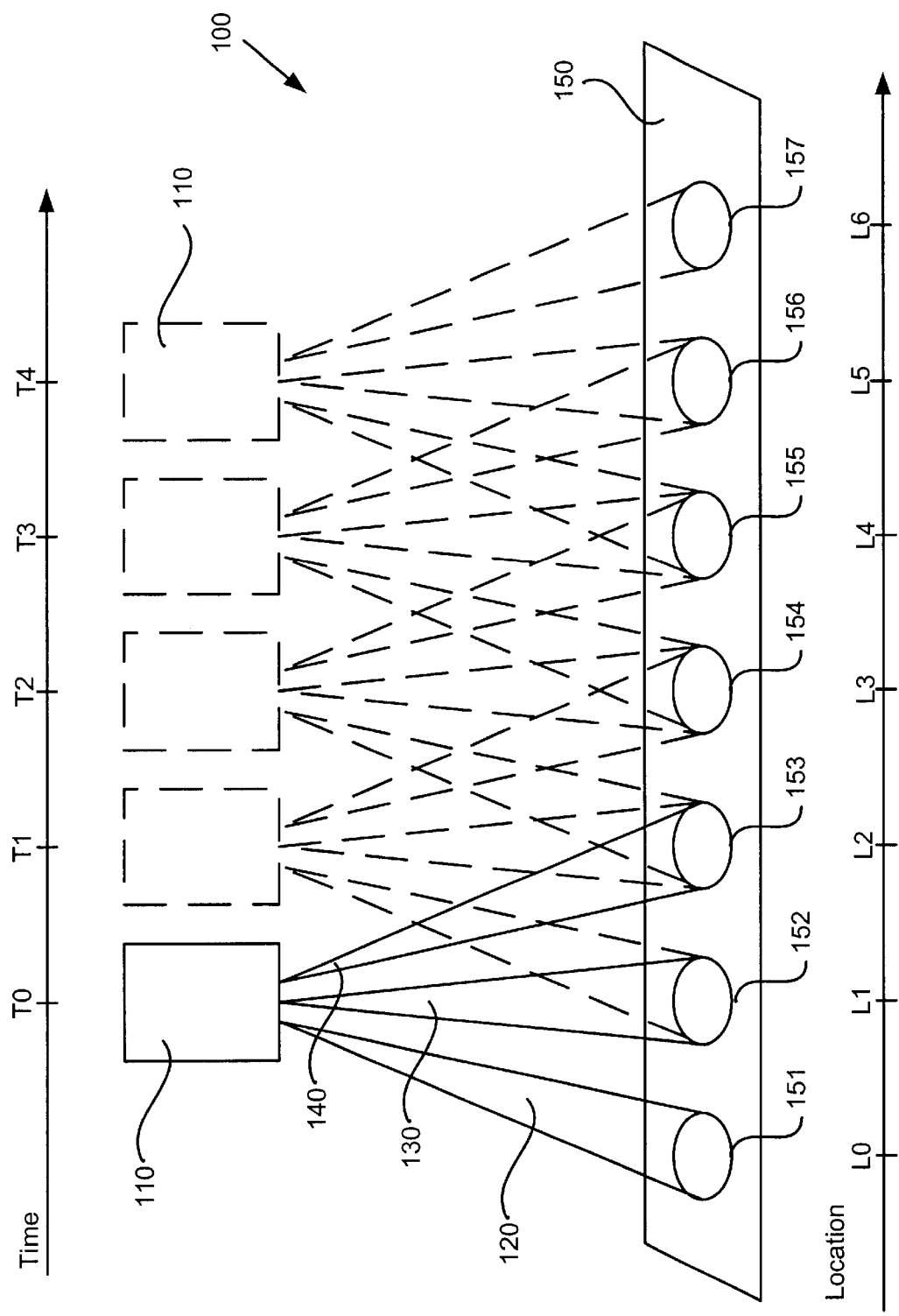
FIG. 1 is a schematic diagram of an active multispectral remote sensing system according to an implementation consistent with the principles of the invention.

FIG. 1 is a schematic diagram of an active multispectral remote sensing system 100 according to an implementation consistent with the principles of the invention. The system 100 may include a remote sensing platform 110 and a target 150. The remote sensing platform 110 may emit multiple beams of radiation 120–140, which may illuminate different portions 151–157 of the target 150.

The remote sensing platform 110 (or simply "platform") may include a satellite, an airplane, a helicopter, an unmanned aerial vehicle (UAV), a boom mounted on a vehicle, or any other platform that may orient an active multispectral sensor an operational distance from the target 150. In a typical implementation, the platform 110 may be configured to move relative to a stationary target 150, for example, an orbiting motion of a satellite, or a translating motion of an aircraft. One possible implementation may include a stationary platform 110 and a moving target 150, which still produces relative motion between the platform 110 and the target 150. Another implementation may include a stationary platform 110 that changes its fields of view by, for example, a scanning mirror. In such an implementation, the change in fields of view produces apparent movement relative to the platform 110. Further exemplary details of the platform 110 will be discussed below with respect to FIG. 2.

The platform 110 may be configured to emit and detect several beams of radiation 120–140. Although three beams 120, 130, and 140 are shown in FIG. 1, this number is purely for ease of explanation, and more or fewer beams of radiation may be generated and detected by the platform 110. Also for ease of explanation, beams 120–140 will be described as having three distinct wavelengths, $\lambda 1$, $\lambda 2$, and $\lambda 3$, respectively. Each beam need not have a distinct wavelength from the other beams, however, so long as at least two beams have different wavelengths. The wavelengths of the emitted radiation may fall in the ultraviolet, visible, shortwave-length infrared (SWIR), mid-wavelength infrared (MWIR), long-wavelength infrared (LWIR), or any other electromagnetic region suitable for active remote sensing.

The target 150 may include a solid surface (e.g., the ground), objects (e.g., vehicles), vegetation, chemicals, gas/aerosol, or any other typical target of active remote sensing that has spectral features capable of multispectral measurement. Those skilled in the active remote sensing arts will appreciate various schemes for measuring absorption or differential absorption of target 150 from detected radiation. Accordingly, the specifics of generating spectra from detected radiation will not be further discussed.

As the platform 110 moves (e.g., from time T0 to T1 to T2, etc), different portions of the target 150 will be illuminated by the emitted radiation. For example, at time T0, portion 151 is initially illuminated by beam 120; portion 152 is initially illuminated by beam 13; and portion 153 is initially illuminated by beam 140. Similarly, at time T1, beams 120–140 respectively illuminate portions 152–154. Such later positions of platform 110 and beams 120–140 are shown with dotted lines in FIG. 1. For later reference in the application, portions of the target 151–157 may be described as respectively corresponding to locations L0–L6 shown in FIG. 1.

Exemplary Platform

Figure 2:
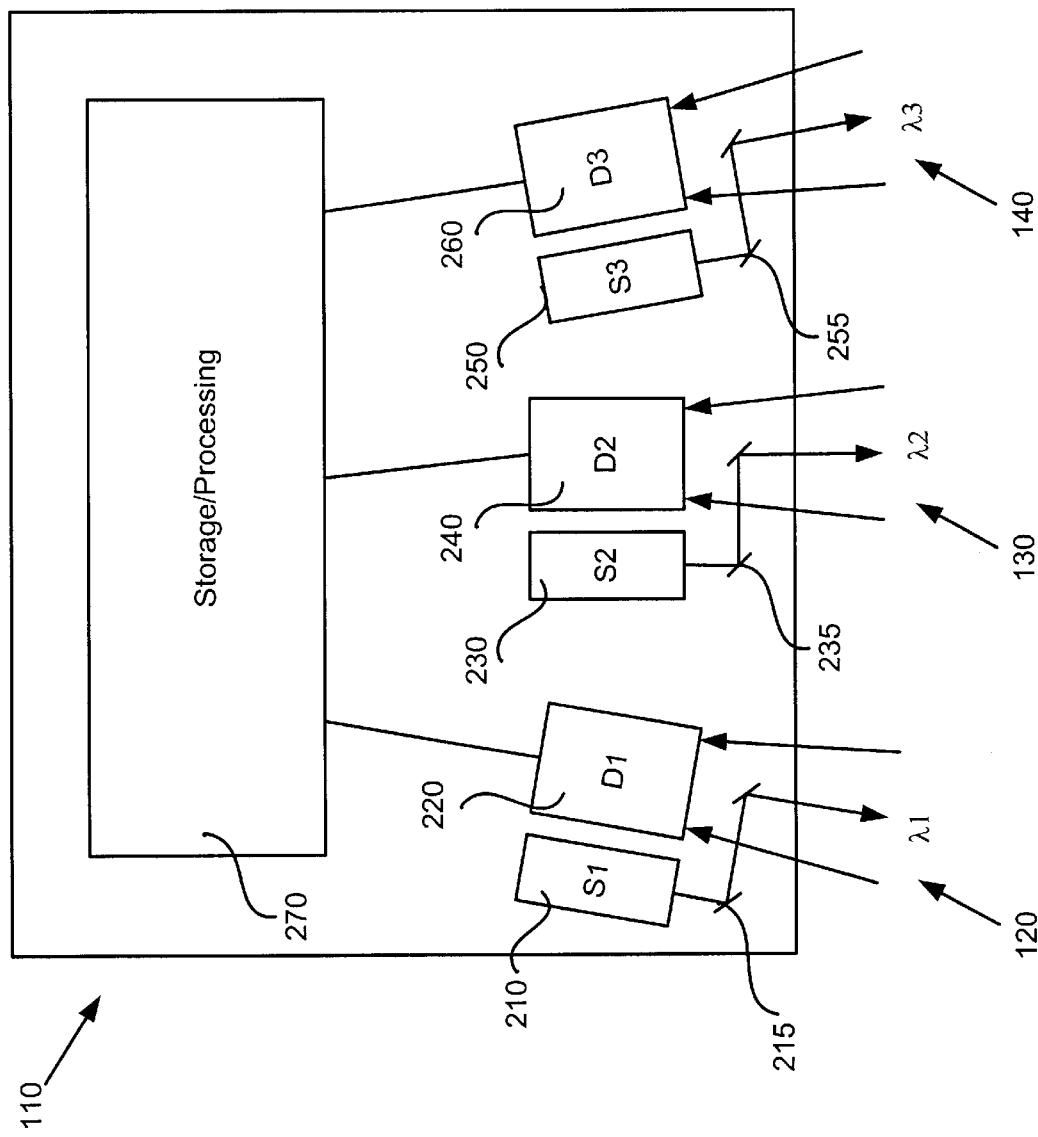
FIG. 2 is an exemplary implementation of a remote sensing platform of FIG. 1 shown in greater detail.

FIG. 2 is an exemplary implementation of the remote sensing platform 110 shown in greater detail. The platform 110 may include three radiation sources 210, 230, and 250; three corresponding detectors 220, 240, and 260; three associated optics 215, 235, and 255; and a storage/processing unit 270. Because the structure and function of the three source/detector pairs is similar, only the first (i.e., S1/D1) will be described in detail. The optical arrangement of these source/detector pairs illustrated in FIG. 2 is solely for ease of explanation, and should not be construed as limiting possible optical configurations, as explained further below.

Source 210 may include a laser or other radiation source that is configured to emit radiation of wavelength $\lambda 1$ (i.e., beam 120). The laser in source 210 may be a pulsed or continuous wave (CW) laser transmitter. Optics 215 may be configured to direct the emitted radiation along the field of view (FOV) of the detector 220. Although in FIG. 2, the optics 215 include two mirrors, those skilled in the art will appreciate that other optical arrangements (e.g., gratings, lenses, etc) may also be used.

Detector 220 shares an FOV with the source 210, and detects the radiation of wavelength $\lambda 1$ that returns from the target 150. Because detector 210 does not share FOVs with either of the other two sources 230 and 250, no spectral filter need be used with detector 210. This design avoids the expense of a spectral filter associated with each detector. Further, wavelengths $\lambda 1$, $\lambda 2$, and $\lambda 3$ may be 10–100 times more closely spaced than with filters, because the configuration shown in FIGS. 1 and 2 also avoids crosstalk between wavelengths. Accordingly, more precise (i.e., narrowband) wavelength measurements are possible than with spectral filters.

The particular configuration of the sources 210, 230, and 250 and corresponding detectors 220, 240, and 260 are purely exemplary. For example, common optics could be used among several optical elements (e.g., sources 210, 230, and 250). In one implementation, separate optics may be used for the sources, while common optics may be used for the detectors. In another implementation, one set of common optics may be used for the sources, and another set of common optics may be used for the detectors. Further, detectors 220, 240, and 260 may be part of a detector array, and not separate, provided that these detectors 220, 240, and 260 can maintain separate FOVs. Those skilled in the remote sensing art will be able to choose a suitable optical arrangement consistent with the principles of the invention, which need not be exactly as shown in FIG. 2.

The storage/processing unit 270 may include circuitry to read data from the detectors 220, 240, and 260: In one implementation consistent with the principles of the invention, the storage/processing unit 270 stores all data read from the detectors 220, 240, and 260 for retrieval and processing at a later date. The unit 270 may include one or more shift registers in such an implementation. In other implementations, the unit 270 may process the data from the detectors, rather than merely storing "raw" data. For example, the unit may assemble complete spectra for each location viewed, and/or the collected spectral data may be calibrated as is typically done in the remote sensing art. In other implementations, the storage/processing unit 270 may include a communication link (e.g., a wireless communication link) for transferring raw or processed data off of the platform 110.

Figure 3:
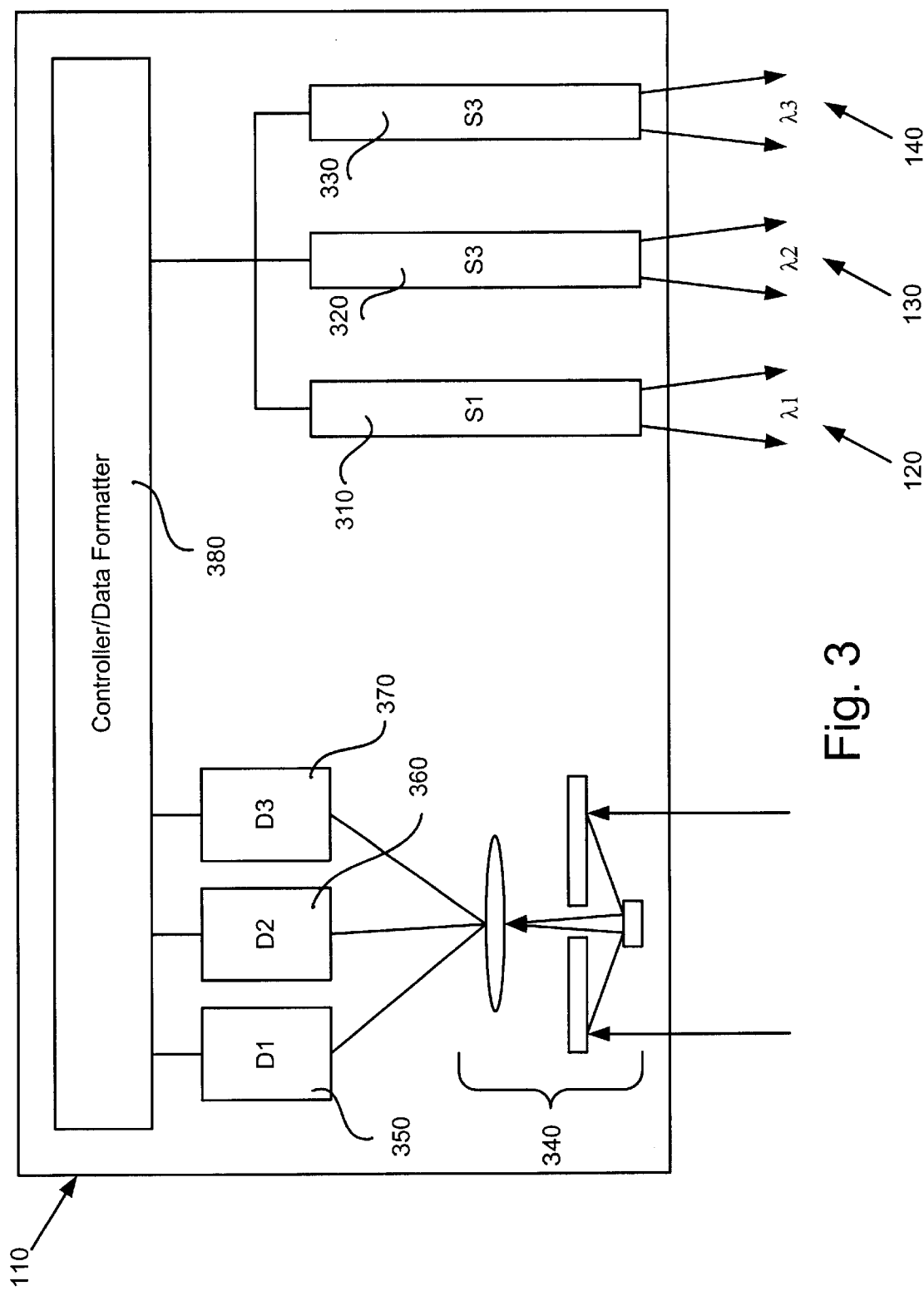
FIG. 3 is another exemplary implementation of a remote sensing platform of FIG. 1 shown in greater detail.

FIG. 3 is another exemplary implementation of the remote sensing platform 110 shown in greater detail. The platform 110 may include three radiation sources 310, 320, and 330; collection optics 340; three corresponding detectors 350, 360, and 370; and a controller/data formatter unit 380. Because the structure and function of the three source/detector pairs is similar, only the first (i.e., S1/D1) will be described in detail.

Source 310 may include a laser or other radiation source that is configured to emit radiation of wavelength $\lambda 1$ (i.e., beam 120). The laser in source 310 may be a pulsed or continuous wave (CW) laser transmitter. Although not shown, source 310 may also include one or more of a distributed feedback (DFB) wavelength stabilization apparatus, an amplifier (e.g., erbium-doped fiber amplifier (EDFA)), amplifier control circuitry, and a beam expander. Those skilled in the art will recognize that various combinations of optical components may be used within sources 310–330 to achieve desired properties of the emitted radiation.

Collection optics 340 may receive radiation reflected/emitted from target 150 and direct the received radiation to detectors 350–370. The optics 340 may be configured to provide different FOVs to detectors 350–370, corresponding to the FOVs of sources 310–330. Although termed "optics" for convenience, the collection apparatus denoted by numeral 340 may also be configured to collect non-optical radiation, if that is what is emitted by sources 310–330. Those skilled in the remote sensing arts will appreciate that various common radiation collectors 340 may be used.

Detector 350 shares an FOV with the source 310, and detects the radiation of wavelength $\lambda 1$ that returns from the target 150. Because detector 210 does not share FOVs with either of the other two sources 320 and 330, no spectral filter need be used with detector 350. This design avoids the expense of a spectral filter associated with each detector. Although not shown, detector 350 may also include one or more of an analog-to-digital converter, a lock-in amplifier, and other signal processing circuitry. Those skilled in the art will recognize that various combinations of components may be used within detectors 350–370 to suitably process the detected radiation.

The controller/data formatter unit 380 may include circuitry to read data from the detectors 350–370. In one implementation consistent with the principles of the invention, the controller/data formatter unit 380 controls the operation of sources 310–330. The unit 380 may also format data from the detectors 350–370 for later storage by a storage unit (not shown). Alternately, the unit 380 may store formatted or unformatted data itself.

Collected Data

Figure 4:
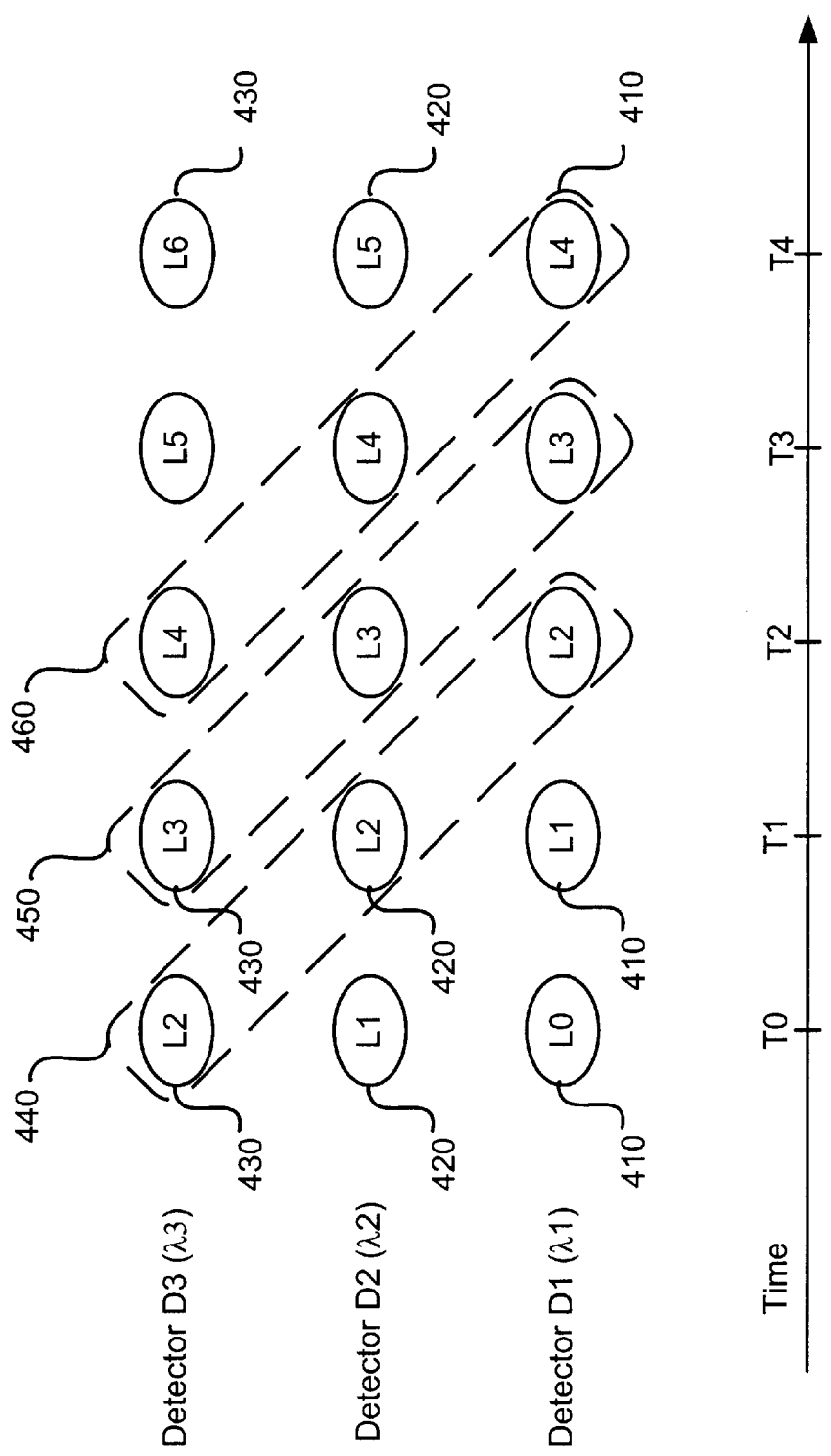
FIG. 4 is a diagram illustrating data collected by exemplary detectors on the platform of FIG. 1.

FIG. 4 is a diagram illustrating data collected by the detectors D1–D3 (e.g., detectors 220, 240, and 260). "Detectors D1–D3" (of which detectors 220, 240, and 260 are one example) will be used in FIG. 4 to illustrate that the data shown may be collected from any arrangement of detectors that have the same FOVs as different-wavelength sources. As used herein a "spectrum" of a location (e.g., L0) includes the magnitudes of radiation detected from that location at multiple wavelengths (e.g., $\lambda 1$, $\lambda 2$, and $\lambda 3$). Similarly, a "complete" spectrum may be defined as having magnitude values for each wavelength emitted by the platform 110 (e.g., three values for the exemplary platform 110 shown in FIG. 2).

FIG. 4 includes three data values 410, 420, and 430 plotted for five times T0–T4. Data value 410 indicates a data value produced by detector D1, which detects reflected radiation at a wavelength $\lambda 1$, at any given time. Similarly, data value 420 indicates a data value produced by detector D2, which detects reflected radiation at a wavelength $\lambda 2$, at any given time. Data value 430 indicates a data value produced by detector D3, which detects reflected radiation at a wavelength $\lambda 3$, at any given time. The labels (e.g., L0–L6) within the data values 410–430 indicate which of the locations L0–L6 shown in FIG. 1, for example, correspond to a given detector's FOV at a given time.

By way of explanation, FIG. 4 shows that at time T0, detector D1 is viewing location L0; detector D2 is viewing location L1; and detector D3 is viewing location L2. Similarly at time T1, when the platform 110 has moved, detector D1 is viewing location L1; detector D2 is viewing location L2; and detector D3 is viewing location L3. Before time T1, the data present in detectors D1–D3 may be read out and stored by storage/processing unit 270, so that new data may be acquired by these detectors at time T1. Those skilled in the remote sensing arts will appreciate that data associated with a certain collection time (e.g., T0) is typically collected over an integration time, and read out before the next collection time (e.g., T1).

The dashed lines around the data values 410–430 represent complete spectra 440–460 for particular locations. For example, spectrum 440 includes data for the location L2 at each of the three wavelengths $\lambda 1$, $\lambda 2$, and $\lambda 3$. As will be apparent from FIGS. 1 and 4, a complete spectrum (e.g., 440) may be gathered for any one location (e.g., L2) by movement of the platform 110 over time (e.g., T0–T2). Continuing the spectrum 440 example, at time T0, location L2 is illuminated by radiation of wavelength $\lambda 3$ (e.g., beam 140), and radiation reflected/emitted from L2 is detected by detector D3. At time T1, location L2 is illuminated by radiation of wavelength $\lambda 2$ (e.g., beam 130), and radiation reflected/emitted from L2 is detected by detector D2. At time T2, location L2 is illuminated by radiation of wavelength $\lambda 1$ (e.g., beam 120), and radiation reflected/emitted from L2 is detected by detector D1.

The complete spectrum 440 is available at time T2, when the data 410 for location L2 is collected. As mentioned above, storage/processing unit 270 may include one or more shift registers, which may sequentially store the data produced by detectors D3–D1 at times T0–T2, respectively. At time T2, for example, the complete spectrum for location L2 may be read out of the shift register. In an alternate implementation where the storage/processing unit 270 stores raw data from the detectors D1–D3, spectra 440–460 may be assembled when complete by reading data from appropriate locations in a memory or other storage medium. In FIG. 4, complete spectra become available at each collection time (e.g., spectrum 450 is available at or after time T3), although other schemes may be envisioned (e.g., using time delayed integration over several detectors to generate data) where complete spectra are available less often. Along these lines, the platform's 110 velocity should preferably be low enough for the detectors to obtain sufficient signal strength at every collection time, but if not, techniques such as time delayed integration may be employed.

Process of Obtaining a Spectrum

Figure 5:
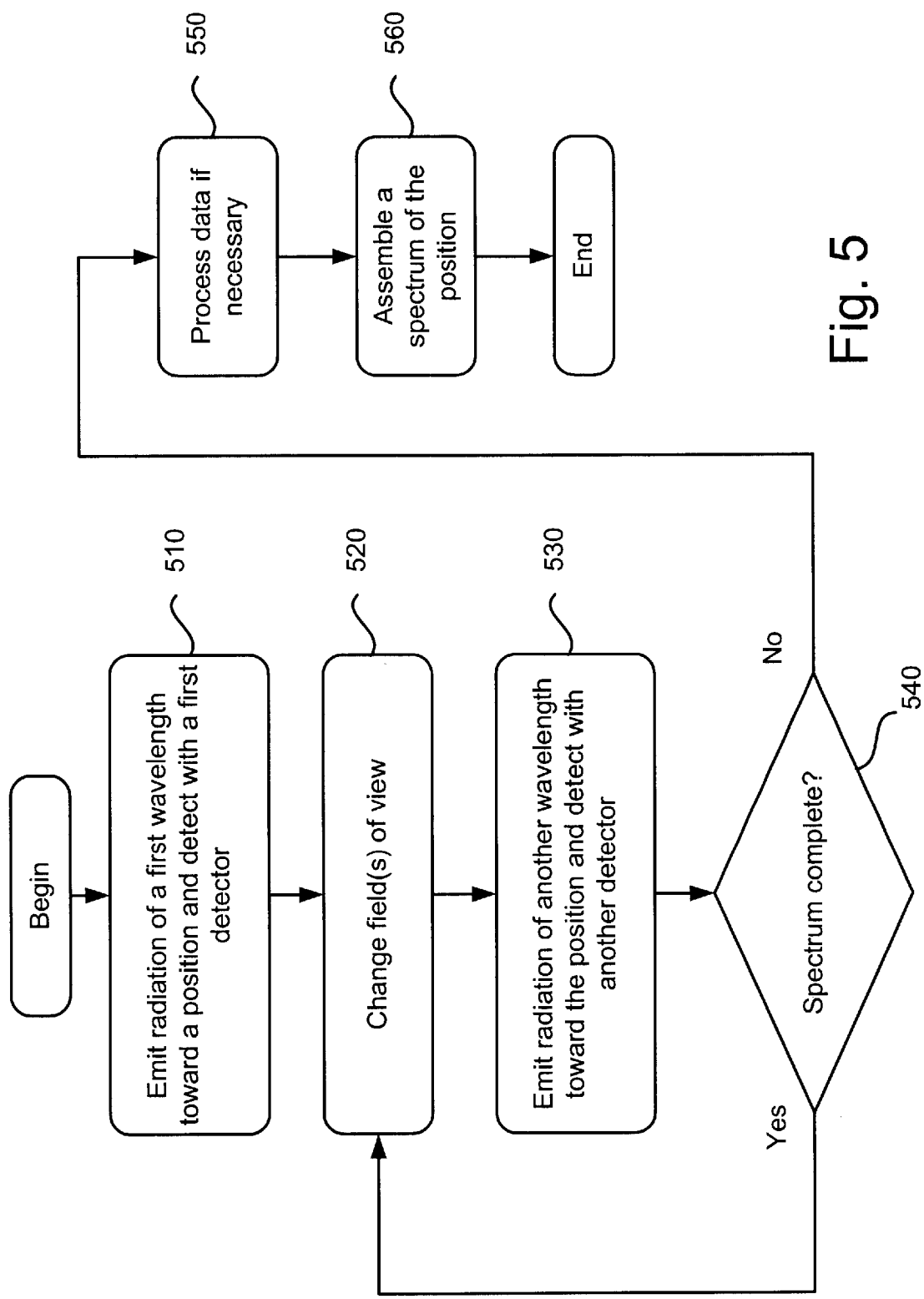
FIG. 5 is flow chart illustrating a process of obtaining a spectrum of a position according to an implementation consistent with the present invention.

FIG. 5 is flow chart illustrating a process of obtaining a spectrum of a single position (e.g., portion 153 of target 150 at location L2) according to an implementation consistent with the present invention. In practice, spectra may be obtained on an ongoing/continual basis for a number of positions by a moving platform 110, but for clarity of explanation, FIG. 5 concentrates on a single spectrum associated with a single position. In other words, as illustrated in FIGS. 1–4, the sources and detectors within the platform 110 function and collect data at all positions of the platform (or all orientations of the sources/detectors, if the platform 110 is stationary), and may be collecting other data from other locations as the acts in FIG. 5 occur. To aid in understanding how a spectrum is constructed for a given position, however, the flow chart of FIG. 5 is with reference to (i.e., from the perspective of) a single position/location on a target 150 (e.g., location L2).

The process may begin with a source in the platform 110 emitting radiation of a first wavelength toward the position (i.e., the field of view of the source emitting the first wavelength radiation), and detecting radiation reflected/emitted with a first detector [act 510]. A signal representing the detected radiation at the first wavelength from the position may be stored. At this time, other sources may be emitting other wavelengths of radiation in other fields of view.

The process may continue by changing the fields of view of the emitting sources (e.g., by moving the platform 110) so that other radiation may be emitted toward the position [act 520]. The platform 110 may emit radiation of another (e.g., second) wavelength toward the position (i.e., the field of view of the source emitting the second wavelength radiation), and may detect radiation reflected/emitted with another (e.g., second) detector [act 530]. A signal representing the detected radiation at this other wavelength from the position may be stored. At this time, other sources may be emitting other wavelengths of radiation in other fields of view.

If the spectrum for the position is not yet complete [act 540], the fields of view of the emitting sources may again be changed and may emit and detect radiation of another (e.g., third, fourth, etc.) wavelength for the position [acts 520 and 530]. The fields of view of the various radiation sources may continue to change (e.g., by platform 110 continuing to move) in any event, but if all available wavelengths have been emitted toward and detected from the position, the spectrum for that position is complete [act 540]. The overall time to obtain a complete spectrum may be relatively short (e.g., 1–1000 msec, although longer or shorter times may also be used) to ensure that the target 150 does not appreciably change during collection of the spectrum.

Once a complete spectrum has been detected for the position, the detected data may be processed if necessary [act 550]. Such processing may include calibration of raw detected data, and/or image registration of the position among the multiple times that the position was illuminated with radiation. Precise positional knowledge and minimal image jitter may aid in ensuring that multiple fields of view overlay the position at different times. Processing may conclude with assembly of the spectrum for the position [act 560]. If the spectral wavelength data corresponding to the position is located in different places within a memory or storage device, for example, the data may be combined into a spectrum in a common location. The spectrum may be re-stored, for example, as a different type of data, or may be read out of a shift register in act 560.

Conclusion

Systems and methods consistent with the principles of the invention may use movement of a remote platform to sequentially illuminate one or more locations with different wavelengths of radiation. Spectra of the one or more locations may be assembled from data collected at different times during the platform's movement.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although "multispectral" has been described as two or more different wavelengths, it is specifically contemplated that "multispectral" may include tens to hundreds of wavelengths (i.e., hyperspectral), to thousands of different wavelengths (e.g., ultraspectral).

Also, although FIG. 4 suggests that one set of collected data (e.g., 410–430) may be collected at each of T0, T1, etc., this need not be the case. For example, if the integration period for the detectors D1–D3 is sufficiently short relative to the period between collection times, other data may also be collected at times T0, T1, etc. In differential absorption Lidar (DIAL), for example, it may be desirable to turn the radiation source off and also collect data under such a condition at times T0, T1, etc.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed:

1. An active system for obtaining a multispectral image of a target, comprising:

a plurality of sources configured to emit radiation toward different locations on the target, at least two of the plurality of sources emitting radiation of different wavelengths;

a plurality of detectors corresponding to the plurality of sources and oriented toward the different locations on the target, at least two of the plurality of detectors being configured to detect the radiation of different wavelengths; and a processor configured to construct spectra of the different locations on the target from data obtained by the plurality of detectors as the system moves relative to the target.

2. The system of claim 1, wherein the plurality of sources includes a plurality of lasers, at least two of which respectively emit the different wavelengths.

3. The system of claim 2, wherein the plurality of lasers includes continuous wave (CW) lasers.

4. The system of claim 1, wherein the plurality of detectors includes:

a first detector configured to detect radiation of a first wavelength from a first location of the different locations at a first time; and a second detector configured to detect radiation of a second wavelength from a second location of the different locations at the first time.

5. The system of claim 4, wherein the first detector is configured to detect radiation of the first wavelength from the second location at a second time after the system has moved.

6. The system of claim 1, wherein the processor is configured to construct a spectrum for one of the different locations from data obtained from the at least two detectors at different times.

7. The system of claim 5, wherein the processor is configured to construct a spectrum for the second location using the radiation of the second wavelength detected by the second detector at the first time and using the radiation of the of the first wavelength detected by the first detector at the second time.

8. The system of claim 1, wherein none of the at least two of the plurality of detectors is associated with a spectral filter.

9. A mobile remote sensing platform, comprising:
a first source having a first field of view and being configured to emit radiation of a first wavelength;
a first detector having a field of view that overlaps the first field of view and being configured to detect the radiation of the first wavelength;
a second source having a second field of view that is separate from the first field of view and being configured to emit radiation of a second wavelength; and
a second detector having a field of view that overlaps the second field of view and being configured to detect the radiation of the second wavelength.

10. The platform of claim 9, wherein each of the first and second sources include a laser.

11. The platform of claim 10, wherein each of the lasers in the first and second sources is a continuous wave (CW) laser.

12. The platform of claim 9, wherein neither of the first and second detectors is associated with a spectral filter.

13. The platform of claim 9, wherein the first field of view corresponds to a position on a target when the platform is in a first location, and
wherein the second field of view corresponds to the position on the target when the platform is in a second location.

14. The platform of claim 13, further comprising:
a processor configured to assemble a spectrum of the position on the target from radiation detected by the first and second detectors.

15. The platform of claim 14, wherein the processor is configured to assemble the spectrum of the position using the radiation of the first wavelength detected by the first detector when the platform is in the first location and using the radiation of the second wavelength detected by the second detector when the platform is in the second location.

16. The platform of claim 9, wherein the first and second fields of view are stationary.

17. A method for constructing a spectrum, comprising:
emitting first and second wavelengths of radiation toward first and second locations, respectively;
detecting the first and second wavelengths of radiation respectively reflected from the first and second locations at a first time;
emitting the first and second wavelengths of radiation toward the second location and a third location, respectively;
detecting the first and second wavelengths respectively reflected from the second and third locations at a second time; and
constructing a spectrum for the second location using the wavelengths of radiation detected at the first and second times.

18. The method of claim 17, wherein the emitting acts each include emitting first and second wavelengths of coherent radiation.

19. The method of claim 17, wherein the detecting acts each include:
detecting the first wavelength of radiation with a first detector, and
detecting the second wavelength of radiation with a second detector.

20. The method of claim 17, wherein the constructing includes:
constructing a spectrum for the second location using the second wavelength of radiation detected at the first time and the first wavelength of radiation detected at the second time.

21. A method for obtaining a spectrum of a location by a platform, comprising:
emitting radiation of a first wavelength toward the location;
detecting radiation of the first wavelength reflected from the location;
changing one or more fields of view of radiation sources within the platform;
emitting radiation of a second wavelength toward the location;
detecting radiation of the second wavelength reflected from the location; and
assembling a spectrum of the location using the detected radiation of the first and second wavelengths.

22. The method of claim 21, wherein the radiation of the first wavelength includes coherent radiation.

23. The method of claim 21, wherein the radiation of the second wavelength includes coherent radiation.

24. The method of claim 21, further comprising:
further changing the one or more fields of view of the radiation sources within the platform;
emitting radiation of a third wavelength toward the location; and
detecting radiation of the third wavelength reflected from the location, wherein the assembling includes:
assembling a spectrum of the location using the detected radiation of the first, second, and third wavelengths.

25. A method for obtaining a spectrum of a location by a remote platform, comprising:
sequentially illuminating the location with different wavelengths of radiation by moving the platform;
sequentially detecting the different wavelengths of radiation reflected from the location and converting the different detected wavelengths into data; and
assembling a spectrum of the location from the data that was sequentially collected.

26. The method of claim 25, wherein the sequentially illuminating includes:
sequentially illuminating the location with the different wavelengths of radiation using respective different sources of radiation.

27. The method of claim 25, wherein the sequentially detecting includes:
sequentially detecting the different wavelengths of radiation with respective different detectors.

* * * * *